US012617350B2

(12) United States Patent
Peterson

(10) Patent No.: US 12,617,350 B2
(45) Date of Patent: May 5, 2026

(54) CLIP FOR HOLDING ARTICLES AND STRUCTURAL ASSEMBLY EQUIPPED WITH CLIP

(71) Applicant: John Peterson, Clearwater, FL (US)

(72) Inventor: John Peterson, Clearwater, FL (US)

(73) Assignee: LEGIT INNOVATIONS LLC, Clearwater, FL (US)

( * ) Notice: Subject to any disclaimer, the term of this patent is extended or adjusted under 35 U.S.C. 154(b) by 461 days.

(21) Appl. No.: 18/201,298

(22) Filed: May 24, 2023

(65) Prior Publication Data

US 2023/0322165 A1      Oct. 12, 2023

Related U.S. Application Data

(63) Continuation-in-part of application No. 17/887,420, filed on Aug. 13, 2022, now Pat. No. 11,794,559.

(60) Provisional application No. 63/328,305, filed on Apr. 7, 2022.

(51) Int. Cl.
B60R 11/00 (2006.01)

(52) U.S. Cl.
CPC ....... B60R 11/00 (2013.01); *B60R 2011/0035* (2013.01); *B60R 2011/0052* (2013.01); *B60R 2011/0057* (2013.01); *B60R 2011/0071* (2013.01)

(58) Field of Classification Search
CPC .......................... B60R 11/00; B60R 2011/0035
USPC .................. 296/97.5; 248/316.7; 24/457, 458
See application file for complete search history.

(56) References Cited

U.S. PATENT DOCUMENTS

| | | | | |
|---|---|---|---|---|
| 541,803 | A | * | 6/1895 | Barus ........................ A41B 3/08 |
| | | | | 24/DIG. 8 |
| 2,842,823 | A | * | 7/1958 | Kopelman .............. D06F 55/00 |
| | | | | 24/457 |
| 4,317,589 | A | * | 3/1982 | Kuss ...................... B60J 3/0208 |
| | | | | 296/97.6 |
| 5,040,841 | A | * | 8/1991 | Yang ...................... B60J 3/0208 |
| | | | | 296/97.7 |
| 5,653,414 | A | * | 8/1997 | Chimel .................. G02C 11/00 |
| | | | | 248/902 |
| 10,012,346 | B2 | * | 7/2018 | Killion .................... B42F 1/006 |

(Continued)

FOREIGN PATENT DOCUMENTS

KR            200232160 Y1 *   7/2001

*Primary Examiner* — Joseph D. Pape
(74) *Attorney, Agent, or Firm* — DP IP GROUP; Franco S. De Liguori

(57) ABSTRACT

The invention is directed to a clip for holding articles includes a main body having a first body portion and a second body portion mounted to undergo pivotal movement relative to the first body portion for selectively positioning the clip between an open state and a closed state. The first state of the clip is configured to allow an article to be positioned between the first and second body portions, and the closed state of the article is configured to securely hold the article between the first and second body portions. A biasing member is mounted between the first and second body portions for biasing the clip to the closed state. The clip is configured for placement in the open state by pivotal movement of the first body portion relative to the second body portion against the biasing force of the biasing member. The invention is also directed to a sun visor assembly equipped with the clip.

20 Claims, 20 Drawing Sheets

(56)            References Cited

U.S. PATENT DOCUMENTS

2008/0164391 A1*   7/2008  Kushner  ...............  A47F 5/0006
                                                              248/227.2
2011/0069481 A1*   3/2011  Chen  .......................  B60R 11/00
                                                              224/400
2011/0219589 A1*   9/2011  Yoneyama  ...............  A45D 8/20
                                                              24/530

* cited by examiner

CLIP FOR HOLDING ARTICLES AND STRUCTURAL ASSEMBLY EQUIPPED WITH CLIP

CROSS-REFERENCE TO RELATED APPLICATION

This application is a continuation-in-part of U.S. patent application Ser. No. 17/887,420, filed Aug. 13, 2022, which claims the benefit of U.S. Provisional Application No. 63/328,305, filed Apr. 7, 2022, the contents of which are incorporated herein by reference in their entirety.

BACKGROUND

Field

The present invention generally relates to clips for holding articles of different types and, in particular, to clips for holding and/or gripping sunglasses, reading glasses, driving glasses, and the like. The present invention also relates to structural assemblies equipped with the clips, such as sun visors.

Background Information

Clips have been used to hold or grip a variety of items, such as sunglasses, reading glasses, driving glasses, and the like. These clips are typically mounted on structural assemblies, such as sun visors which have been primarily provided in motor vehicles for blocking sunlight shining through the windshield.

When used in connection with sun visors, these existing clips are typically removably attached to a free side edge of the sun visor after which the various items are held or gripped by the clips while attached to the sun visor. A disadvantage to using such sun visor clips is that vehicle visors are subjected to vibrations from the vehicle. As a result of such vibrations, the clips require substantial holding and clamping force. The required holding and clamping force increase as the overall weight of the items held by the clip increases. Furthermore, the existing clips tend to slide off the sun visor as a result of vehicle vibrations or during movement of the sun visor by the driver/passenger to block sunlight, for example. Similar problems exist when the existing clips are mounted to structural assemblies other than sun visors in terms of their ability to securely retain the clips while holding/gripping the various objects.

There is, therefore, a need for clips for holding and gripping a variety of items, such as sunglasses, reading glasses, driving glasses, and the like, as well as structural assemblies for securely retaining such clips, which overcome the foregoing and other related disadvantages in the prior art.

SUMMARY

In one aspect, the present invention is directed to a clip for removably and securely holding articles. The clip includes a main body having a first body portion and a second body portion mounted to undergo pivotal movement relative to the first body portion for selectively positioning the clip between an open state and a closed state. The first state of the clip is configured to allow an article to be positioned between the first and second body portions. The closed state of the article is configured to securely hold the article between the first and second body portions. A biasing member is mounted between the first and second body portions for biasing the clip to the closed state. The clip is configured for placement in the open state by pivotal movement of the first body portion relative to the second body portion against the biasing force of the biasing member.

According to a feature of the present invention, a cushioning member is disposed between the first and second body portions for protecting an article, or a portion or parts of the article, that this held therebetween.

As another feature of the invention, the first body portion has a pivotal shaft, and the second body portion has a pair of pivotal arms configured for connection to respective ends of the pivotal shaft to permit pivotal movement of the first body portion relative to the second body portion.

In yet another feature of the invention, the biasing member is configured to be securely retained between the first and second body portions by a holding recess formed in the first body portion and a holding pin extending from the second body portion. The holding recess is formed at one end of the first body portion and adjacent to the pivotal shaft and is configured to receive at least a portion of the biasing member, and the holding pin extends from an end of the second body portion and adjacent to the pivotal arms.

As still another feature of the invention, each of the first and second body portions is a unitary structure formed from a single piece of material, such as a plastic material.

As a further feature of the present invention, the clip comprises mounting means for mounting the clip to a structural assembly.

In one embodiment, the mounting means comprises a pair of first fasteners extending from a surface of the second body portion. The clip is configured to be mounted to the structural assembly by passing the first fasteners through respective openings formed in the structural assembly and bringing the first fasteners into engagement with respective second fasteners to securely mount the clip to the structural assembly.

In another embodiment, the mounting means comprises a retaining element securely connected to a surface of the second body portion and configured for removable connection to the structural assembly. The retaining element has leg portions, and retaining recesses formed in the surface of the second body portion are configured for securely removably receiving and retaining therein the respective leg portions of the retaining element.

In yet another embodiment, the mounting means comprises magnetic members connected to a surface of the second body portion and configured for removable magnetic connection to the structural assembly. Retaining recesses are formed in the surface of the second body member for receiving and retaining therein the respective magnetic members. As an example of this embodiment, the magnetic members are configured for magnetic connection to a corresponding magnetic surface of the structural assembly.

In another aspect, the present invention is directed to a structural assembly equipped with the clip according to any of the foregoing embodiments of the present invention. In an exemplary embodiment, the structural assembly is a vehicle sun visor assembly.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The foregoing summary, as well as the following detailed description of preferred embodiments of the disclosure, will be better understood when read in conjunction with the accompanying drawings. For the purpose of illustrating the disclosure, there is shown in the drawings embodiments which are presently preferred. It should be understood, however, that the disclosure is not limited to the precise arrangement and instrumentalities shown.

Figures 11, 12:
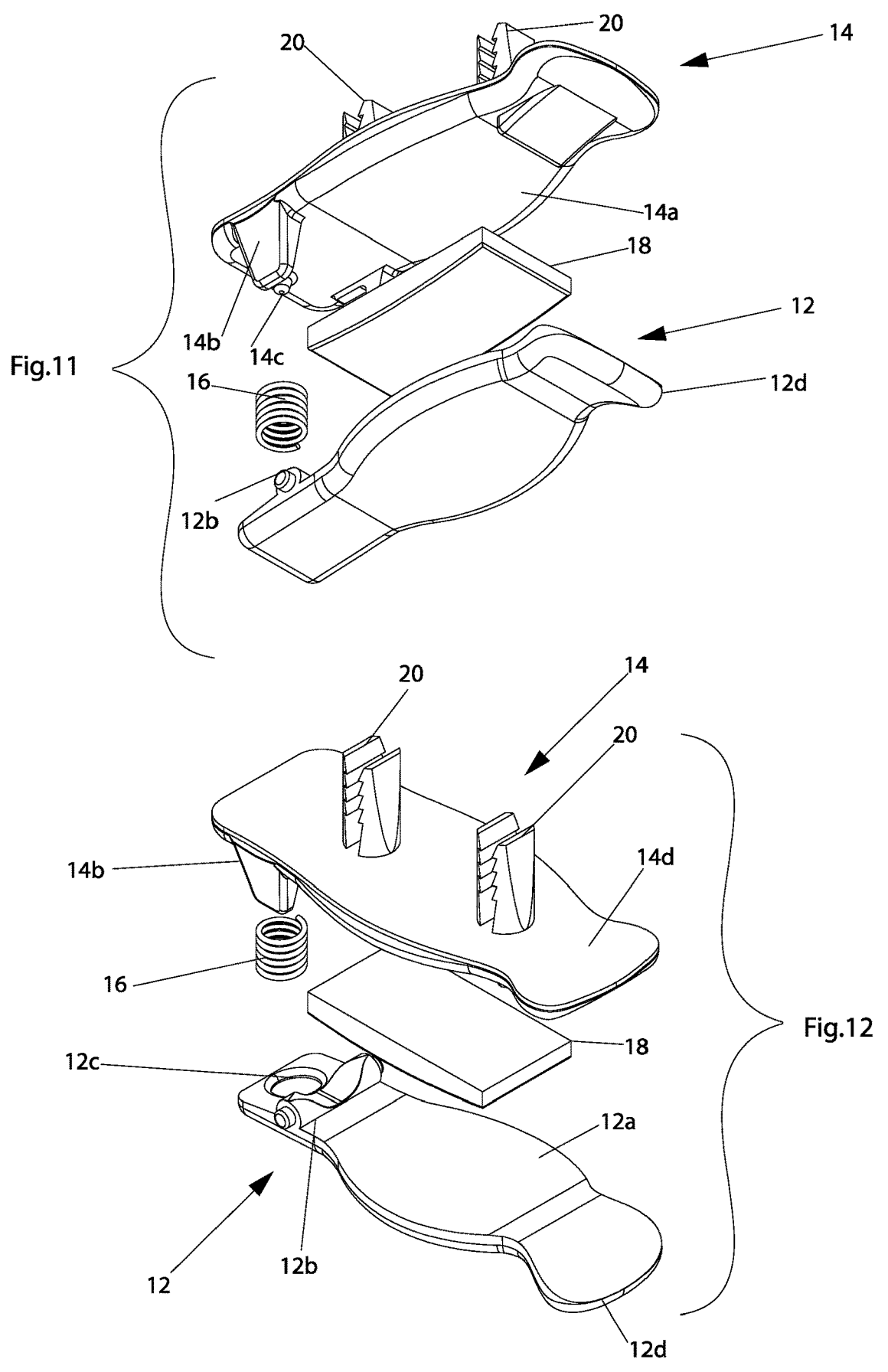

FIG. 11 is an exploded view in perspective of the clip in FIG. 1;

FIG. 12 is another exploded view in perspective of the clip in FIG. 1;

DETAILED DESCRIPTION

Figure 1:
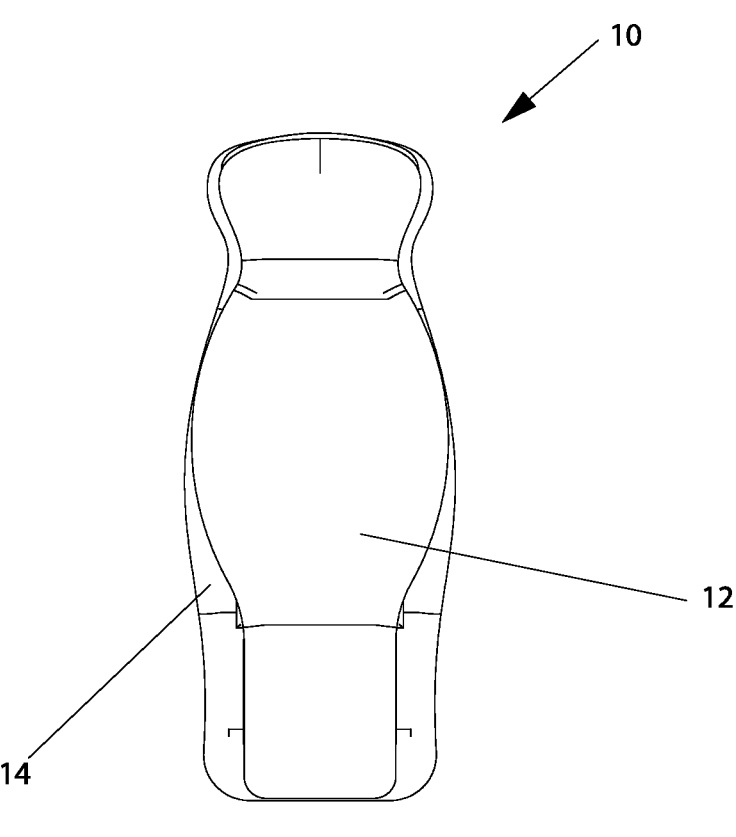
FIG. 1 is a top view of a clip according to a first embodiment of the present invention.
Figure 2:
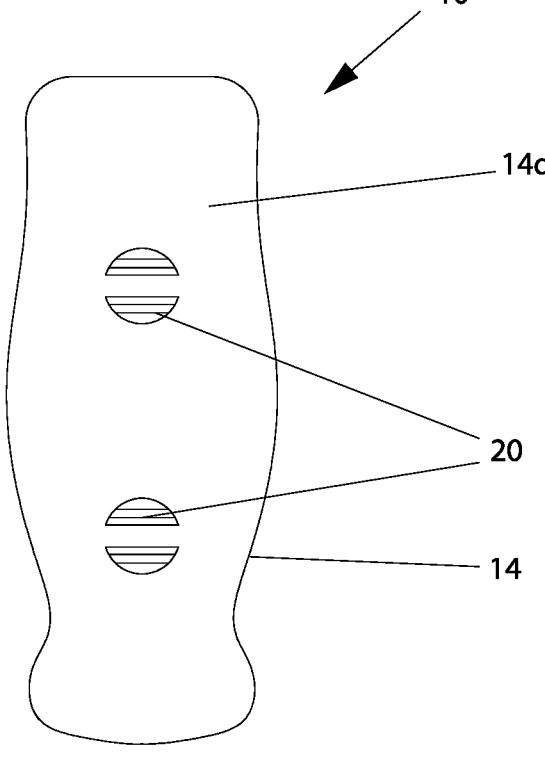
FIG. 2 is a rear view of the clip in FIG. 1.
Figure 3:
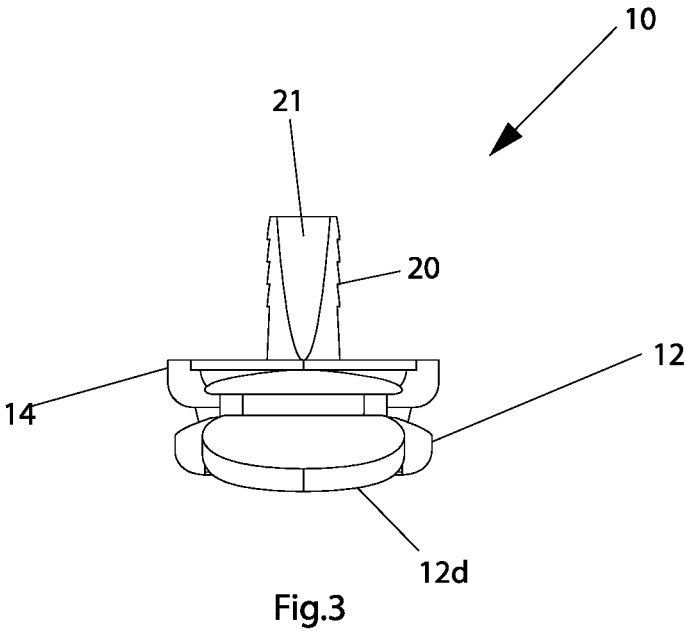
FIG. 3 is a front view of the clip in FIG. 1.
Figure 4:
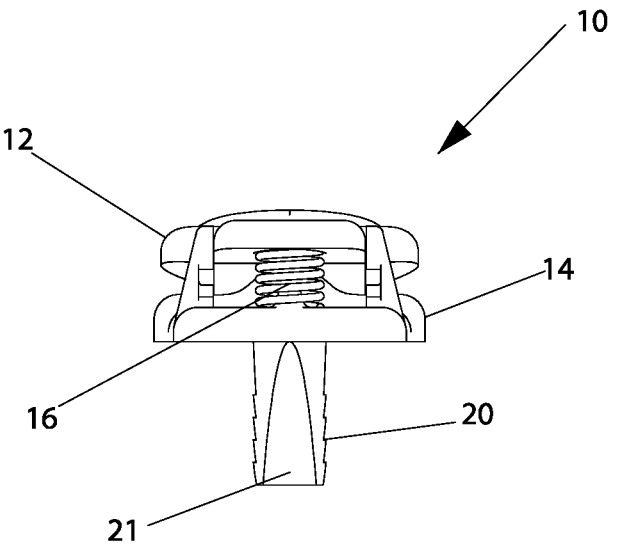
FIG. 4 is a rear view of the clip in FIG. 1.
Figure 5:
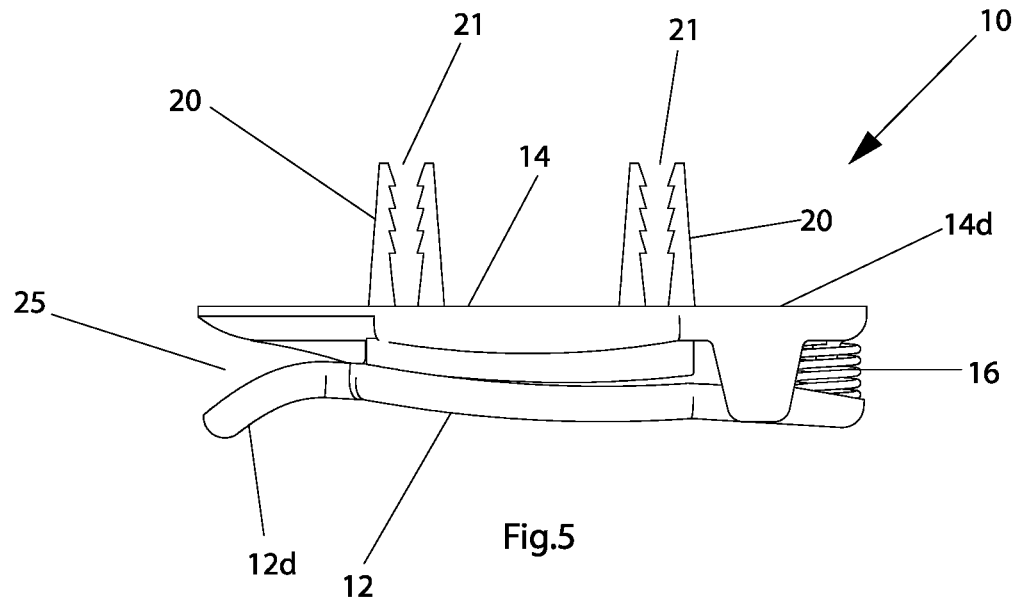
FIG. 5 is a left side view of the clip in FIG. 1.
Figure 6:
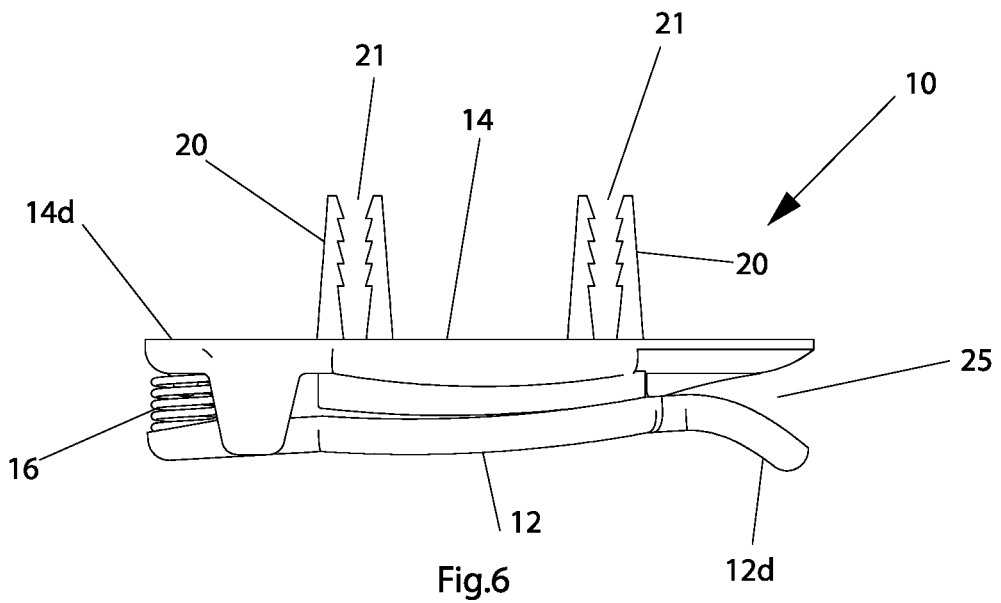
FIG. 6 is a right-side view of the clip in FIG. 1.
Figure 7:
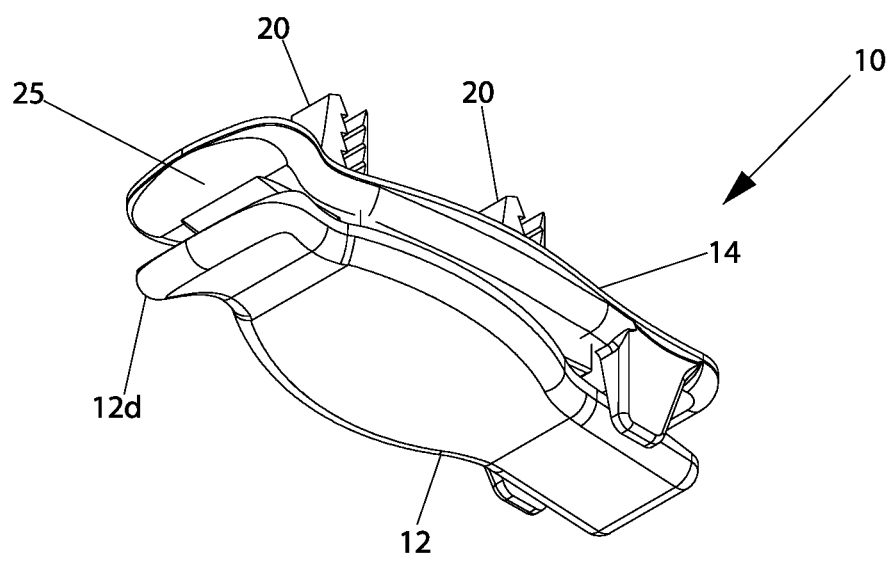
FIG. 7 is a top right perspective view of the clip in FIG. 1.
Figure 8:
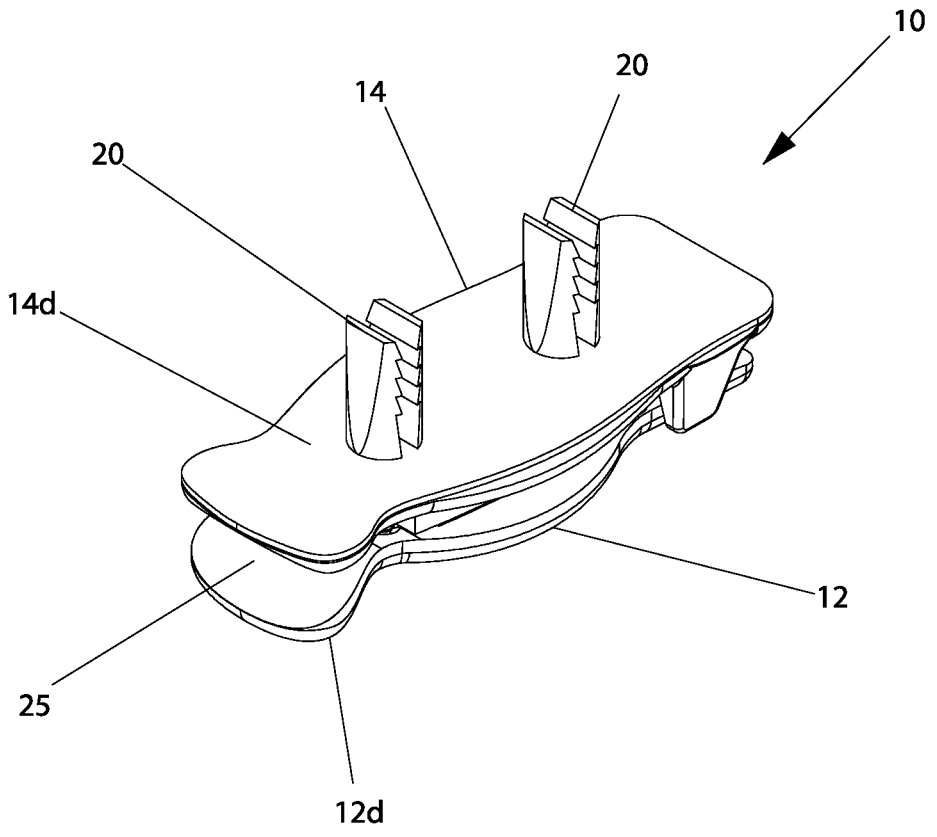
FIG. 8 is a bottom right perspective view of the clip in FIG. 1.
Figure 9:
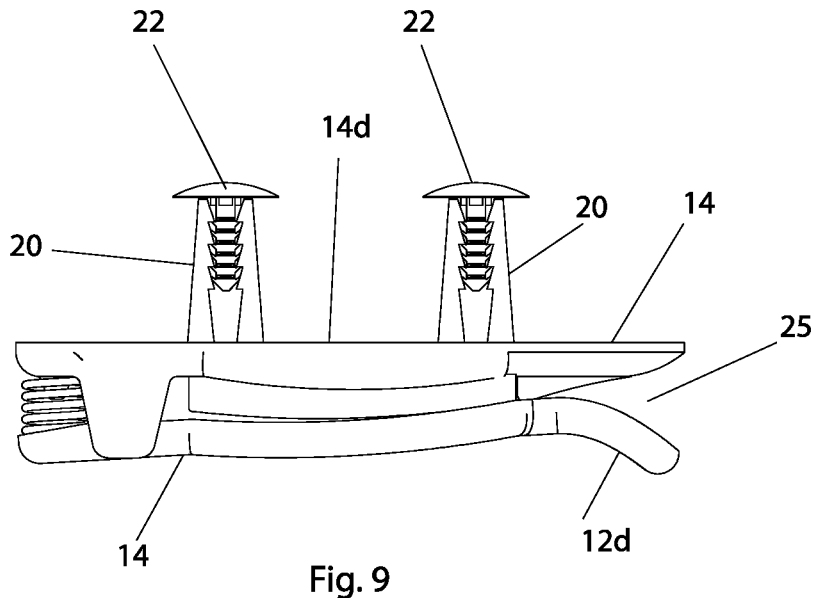
FIG. 9 is a view of the clip similar to FIG. 6, except that FIG. 9 additionally shows retainer fasteners connected to locking members extending from the rear side of the clip.
Figure 10:
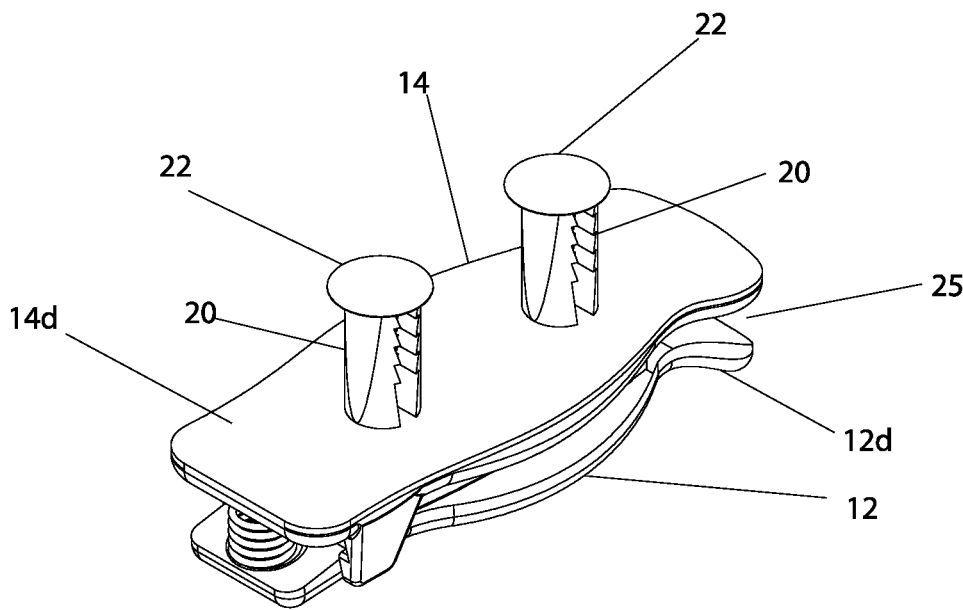
FIG. 10 is a left side perspective view of the visor in FIG. 9.
Figures 13, 14:
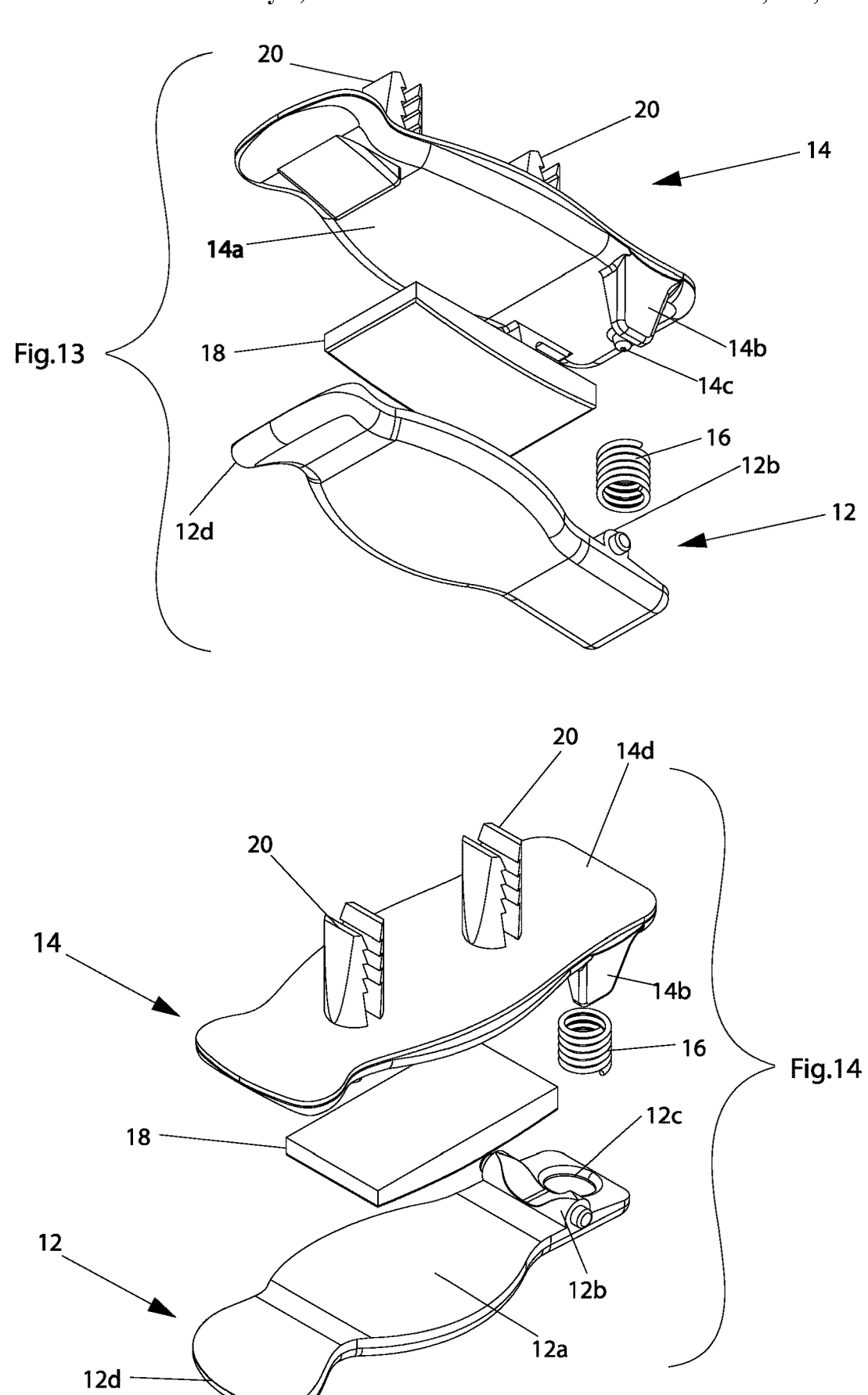
FIG. 13 is another exploded view in perspective of the clip in FIG. 1.
FIG. 14 is another exploded view in perspective of the clip in FIG. 1.
Figure 15:
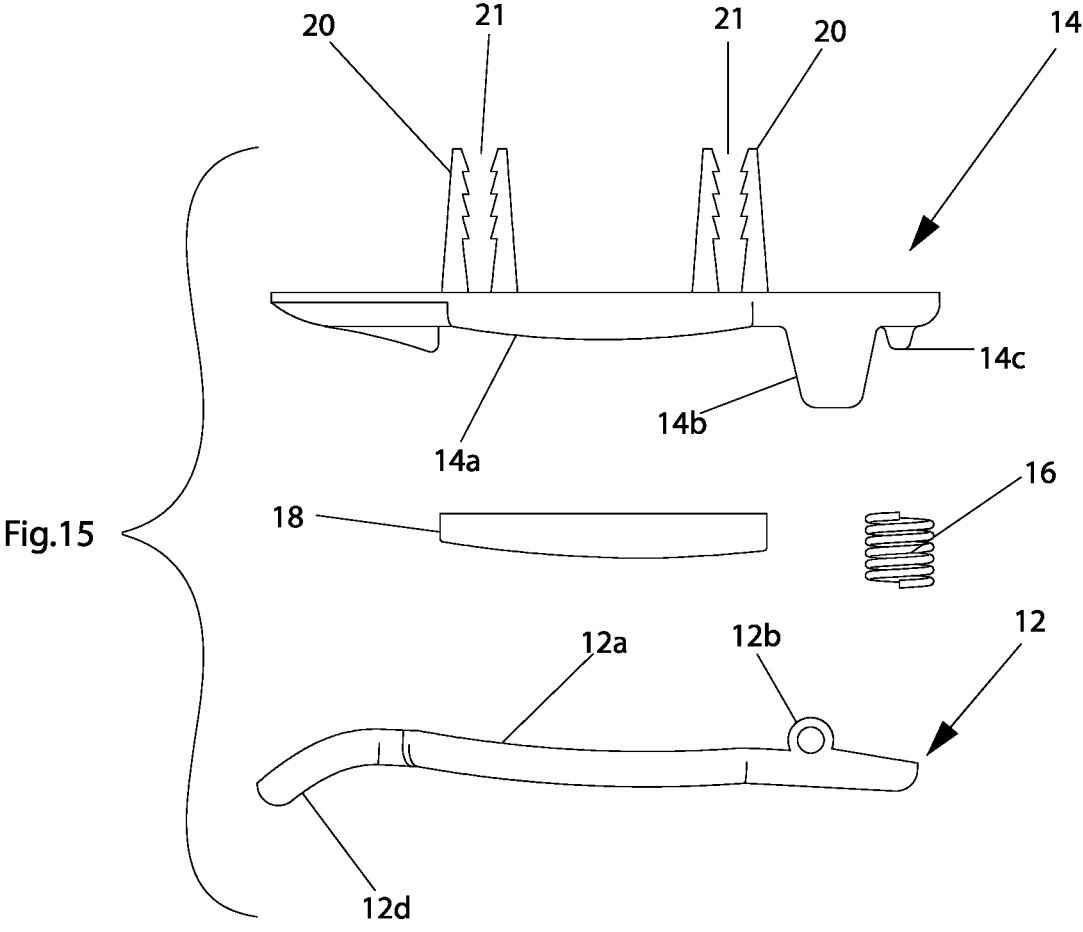
FIG. 15 is an exploded view of the clip in FIG. 5.

The present disclosure now will be described more fully hereinafter with reference to the accompanying drawings, in which exemplary embodiments of the disclosure are shown and similar reference numerals denote the same or similar structure throughout. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

The word "exemplary" is used herein to mean "serving as an example, instance, or illustration". Any embodiment described herein as "exemplary" is not necessarily to be construed as preferred or advantageous over other embodiments.

For convenience of description, the terms "front", "back", "upper", "lower", "top", "bottom", "front", "rear", "right", "left", "side" and words of similar import will have reference to the various members and components of the exercise device of the present disclosure as arranged and illustrated in the figures of the drawings and described hereinafter in detail.

It should also be understood that the terms "about," "approximately," "generally," "substantially" and like terms, which may be used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

FIGS. 1-15 show various views of a first embodiment of an article clip (hereinafter also referred to as "clip"), generally designated with numeral 10, according to a first aspect of the present invention. As further described below with reference to FIGS. 16-19, clip 10 is configured to be securely integrated with a structural assembly, such as a sun visor, generally designated with reference numeral 50. The structural assembly equipped with the clip, as disclosed herein, is a second aspect of the present invention.

Clip 10 has a main body formed of a first body portion 12 and a second body portion 14 connected to the first body portion 12. First body portion 12 is configured for undergoing pivotal movement relative to second body portion 14. This allows clip 10 to be selectively positioned by a user between an open state and a closed state. In the open state, clip 10 is configured to receive an article between the first and second body portions 12, 14, and in the closed state clip 10 is configured to clamp or securely hold the received article between the first and second body portions 12, 14. A biasing member 16 is mounted between the first and second body portions 12, 14 for biasing clip 10 to the closed state. That is, clip 10 can be placed in the open state by pivoting first body portion 12 relative to second body portion 14 against the biasing force of biasing member 16.

Referring to FIGS. 11-15, a surface 12a of first body portion 12 is provided with an integral pivotal shaft 12b and a holding recess 12c. A surface 14a of second body portion 14 is provided with a pair of pivotal arms 14b and a holding pin 14c. Pivotal arms 14b are configured for connection to opposite ends of pivotal shaft 12b to permit pivotal movement of first body portion 12 relative to second body portion 14. Holding recess 12c is configured to partially receive biasing member 16 which is configured to receive holding pin 14c. By this construction, holding recess 12c and holding pin 14c collaborate together to securely retain biasing member 16 between first and second body portions 12, 14 so that first body portion 12 is biased in the direction of second body portion 14 in the closed state of clip 10 while allowing first body portion 12 to be pivoted away form second body portion 14 against the force of biasing member 14 to place clip 10 in the open state.

A cushion member 18 is configured to be securely mounted to a generally central region of surface 14a of second body portion 14. Cushion member 18 is preferably formed of any cushioning material capable of protecting the article(s) being clamped or held (e.g., sunglasses, eyeglasses, etc.) between first and second body portions 12, 14 of clip 10. For example, plastic foams made of polyethylene, polypropylene, flexible polyurethane and copolymers of polyethylene with polystyrene may be used for the cushioning materials.

Referring to FIGS. 2-8 and 11-15, a pair of first fasteners 20 extend from a surface 14d of second body portion 14 opposite to surface 14a. As further described below, first fasteners 20 are configured to extend through respective holes 52 formed in a structural assembly (e.g., sun visor) to which clip 10 is to be mounted. Each first fastener 20 is provided with an opening 21 configured to receive a second fastener 22 for securely mounting clip 10 to the structural assembly as further described below. First fasteners 20 and second fasteners 22 can be configured to provide a permanent (i.e., non-removable) connection between clip 10 and the structural assembly. Alternatively, first and second fasteners 20, 22 can be selected so that clip 10 can be removably connected to the structural assembly.

Referring to FIGS. 1, 5-15 and 18, first body portion 12 has a front-end section 12d having a preselected curvature relative to remaining sections of first body portion 12 so that, in the closed state of clip 10 (e.g., FIGS. 5-10, 18, 19), first and second body portions 12, 14 form an access space 25. By this construction, during use of clip 10 while mounted to a structural assembly, the user can mount the article on the clip by merely inserting the article into access space 25 to cause first body portion 12 to pivot away from second body portion 14 against the bias of spring 16 (i.e., the open state of claim 10) until the article rests between surface 12a of first body portion 12 and cushioning member 18. When the user releases the article, the first body portion 12 is caused to pivot towards second body portion 14 by the biasing action of biasing member 16 until clip 10 is in the closed state, at which point the article is securely clamped/held by clip 10. Alternatively, the user can place clip 10 in the open state by manually grasping front end section 12d of first body portion 12 with one hand and pivoting first body portion 12 away from second body portion 14 and then inserting the article between surface 12a and cushioning member 18 (e.g., with the same hand or the other hand), at which point the user can release front end section 12d, so that first body portion 12 is pivoted towards second body portion 14 by the biasing action of biasing member 16, to place clip 10 in the closed state in which the article is securely clamped/held by clip 10.

Each of first body portion 12 and second body portion 14 is preferably constructed from one-piece of continuous plastic material, such as by a suitable injection molding process. For first body portion 12, the one-piece construction includes pivotal shaft 12b and holding recess 12c. For second body portion 14, the one-piece construction includes pivotal arms 14b, holding pin 14c, and first fasteners 20. Alternatively, each of first and second body portions 12, 14 can be made of a suitable metal. In this embodiment, biasing member 16 is illustrated in the drawings as a coil spring. Alternatively, biasing member 16 can be a leaf spring. It is understood, however, that other forms of the biasing member are suitable so long as first body portion 12 can be pivoted relative to second body portion 14 to place clip 10 between the open and closed states as described above.

FIGS. 16-19 show a sun visor assembly, generally designated with numeral 100, in which sun visor 50, as a structural assembly, is equipped with clip 10 as described above in accordance with the first embodiment of the invention. Sun visor 50 includes standard connecting member 75 for mounting sun visor 50 to the interior of a motor vehicle (e.g., on the driver and/or passenger sides) to allow sun visor 50 to be pivoted (e.g., up and down) as is known in the conventional art.

Figures 16, 17:
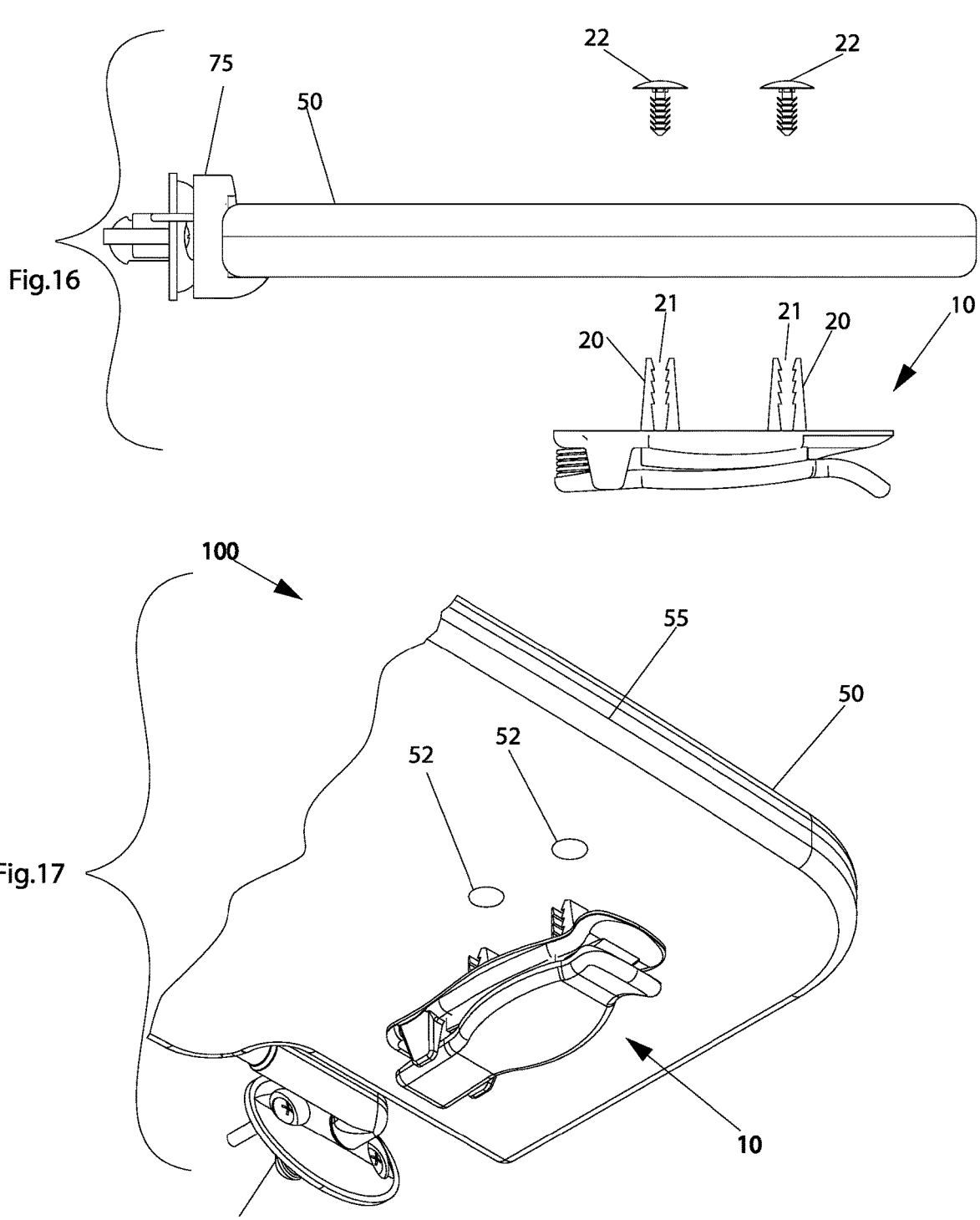
FIG. 16 is an exploded view of an embodiment of a structural assembly, according to a second aspect of the present invention, equipped with the clip of FIG. 6.
FIG. 17 is a partial exploded view in perspective showing the clip of FIG. 6 in the process of being mounted to a sun visor as an example of a structural assembly according to the second aspect of the present invention.
Figure 18:
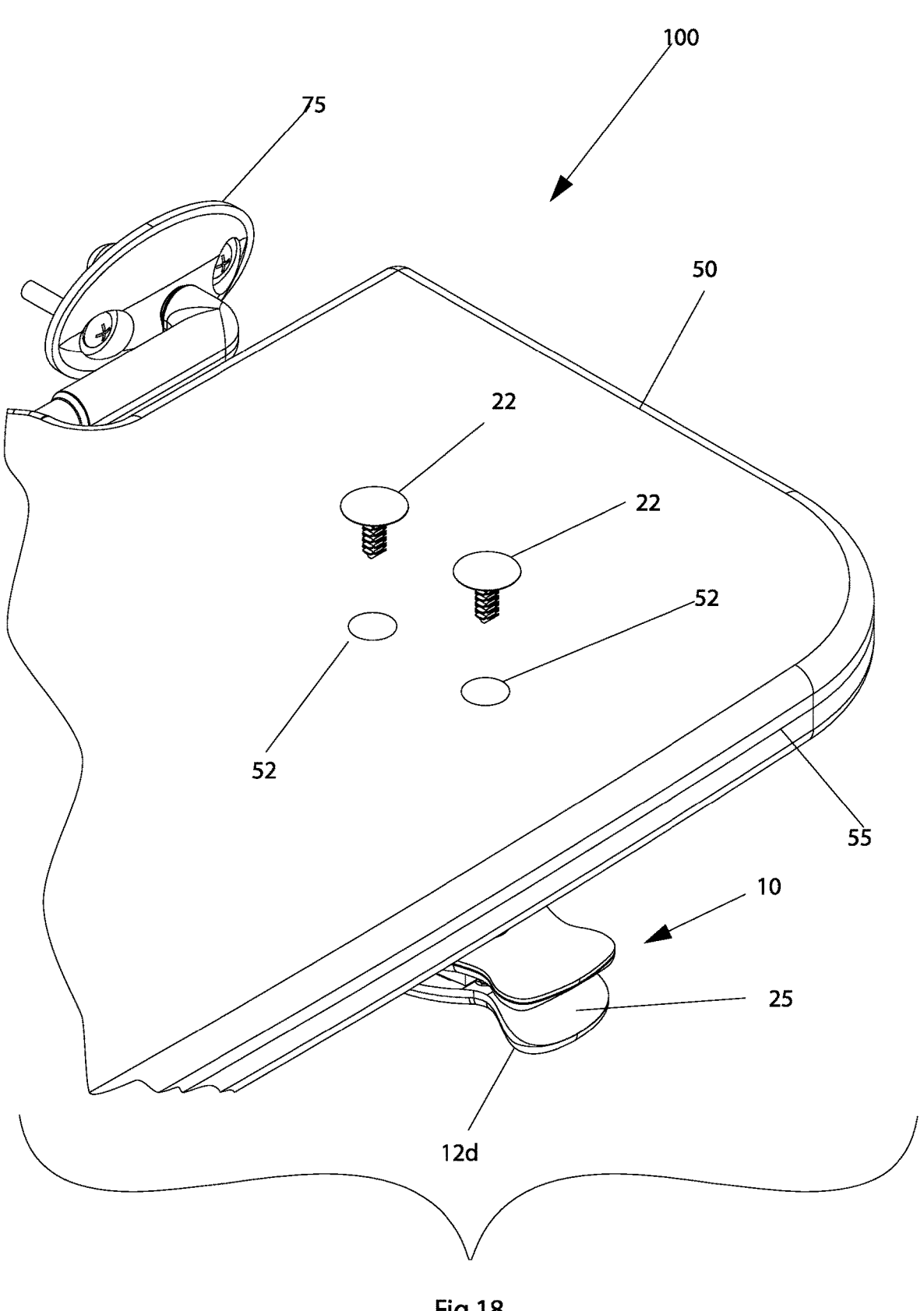
FIG. 18 is another partial exploded view in perspective showing the opposite side of the sun visor with the retainer fasteners in the process of being passed through openings in the sun visor and connected to corresponding locking members of the clip.
Figure 19:
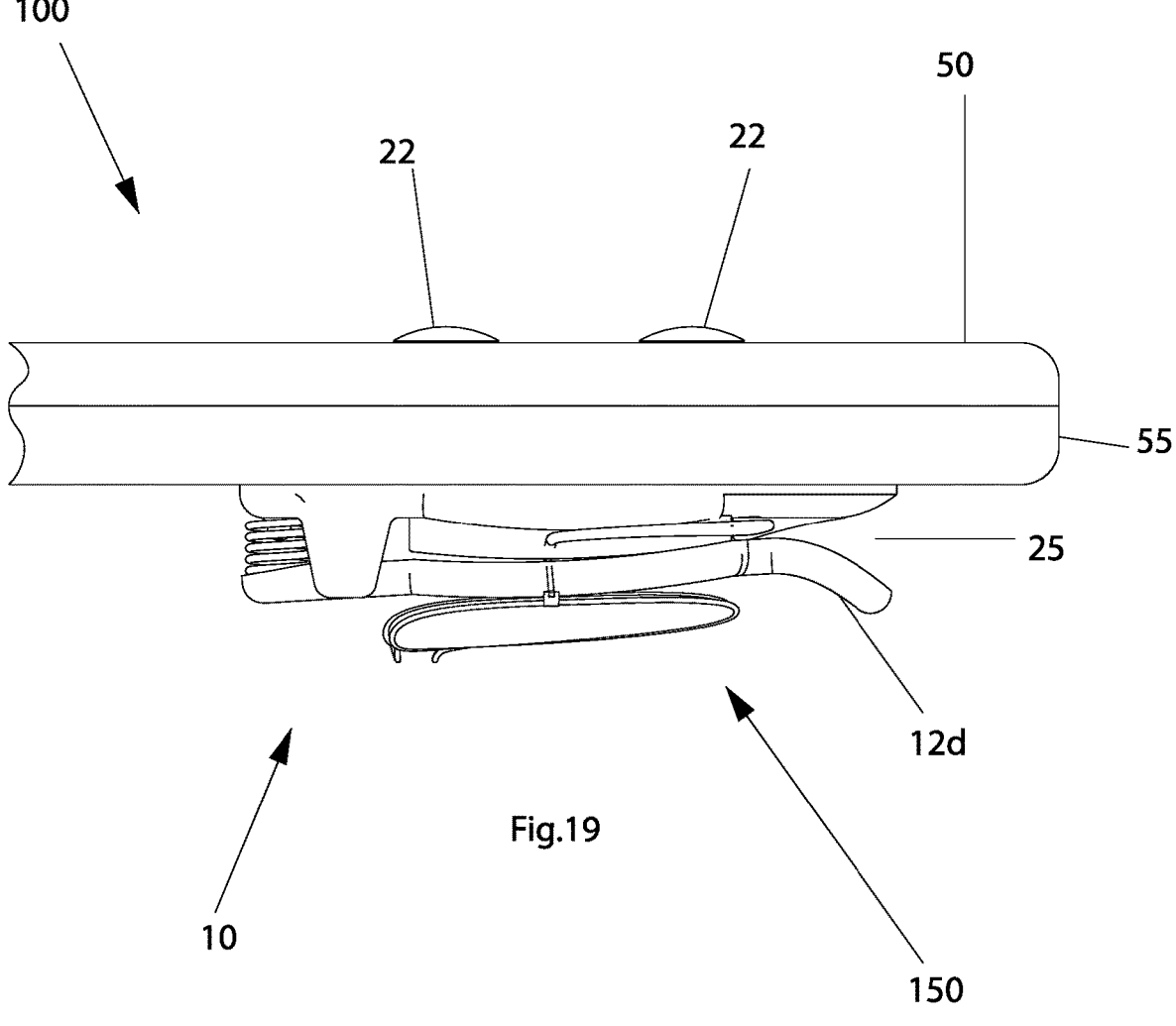
FIG. 19 is a partial side view showing the clip assembled on a structural assembly (e.g., sun visor)
Figures 20, 21:
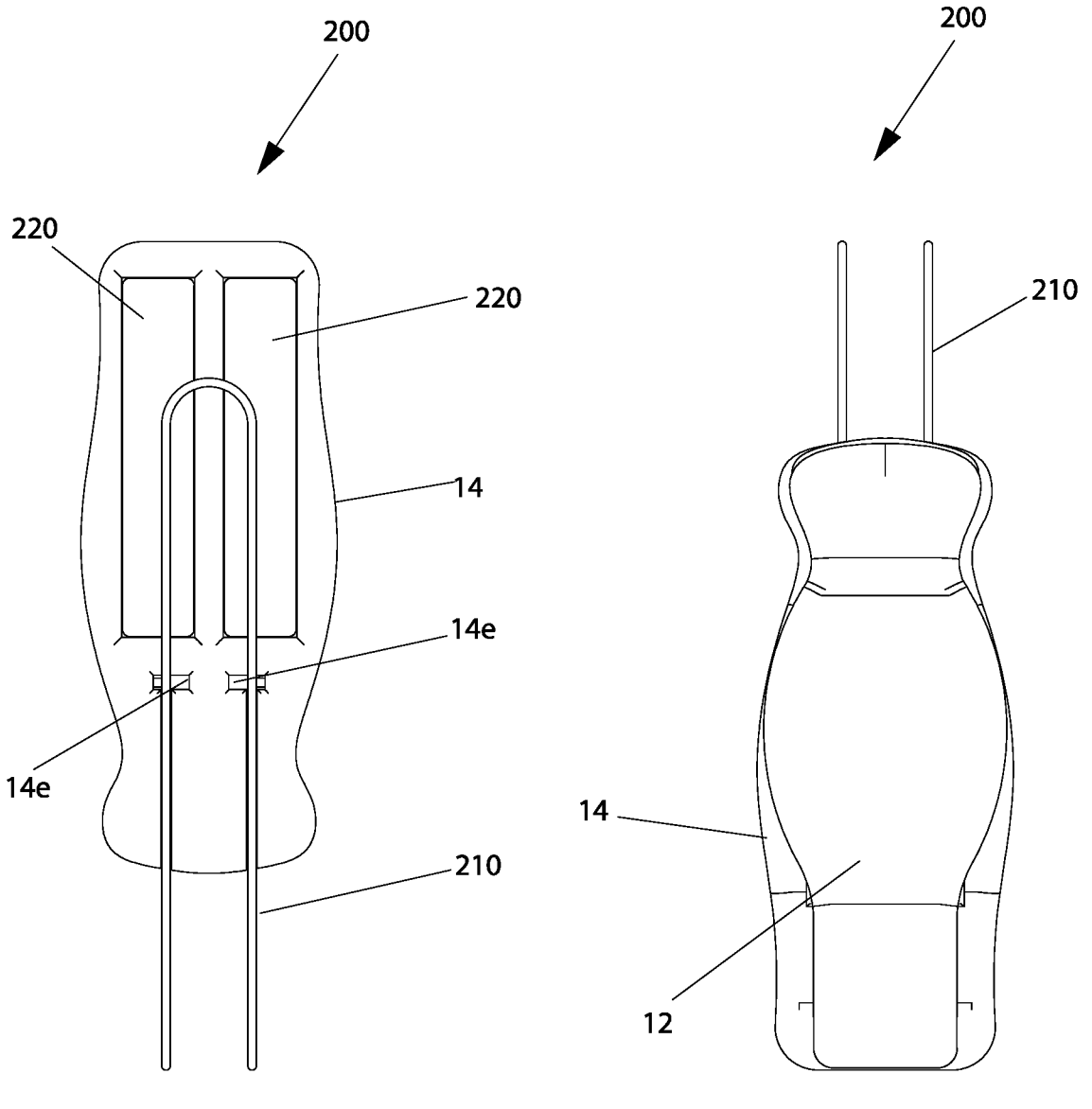
FIG. 20 is a top view of a clip according to a second embodiment of the present invention.
FIG. 21 is a bottom view of the clip in FIG. 20.
Figure 22:
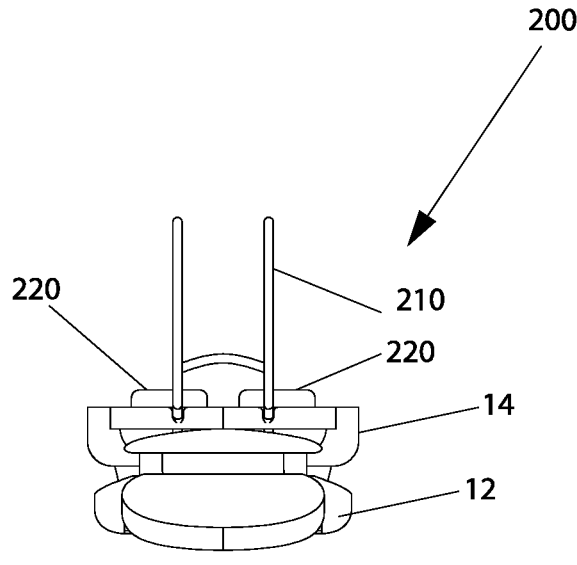
FIG. 22 is a front view of the clip in FIG. 20.
Figure 23:
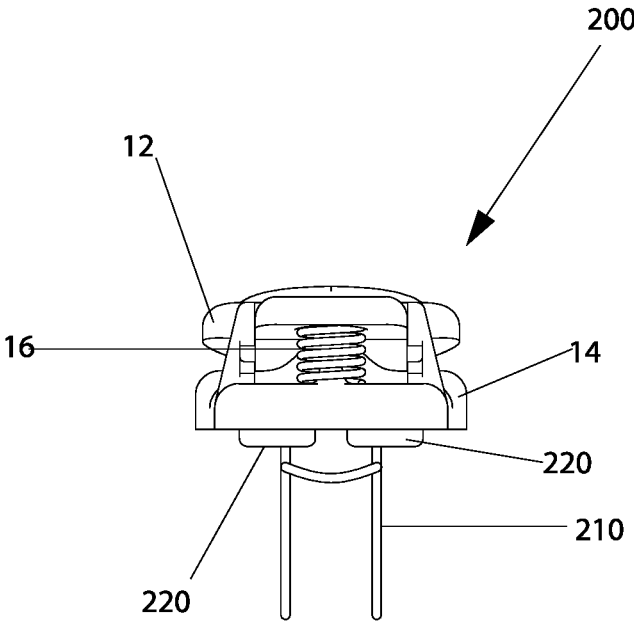
FIG. 23 is a rear view of the clip in FIG. 20.
Figure 24:
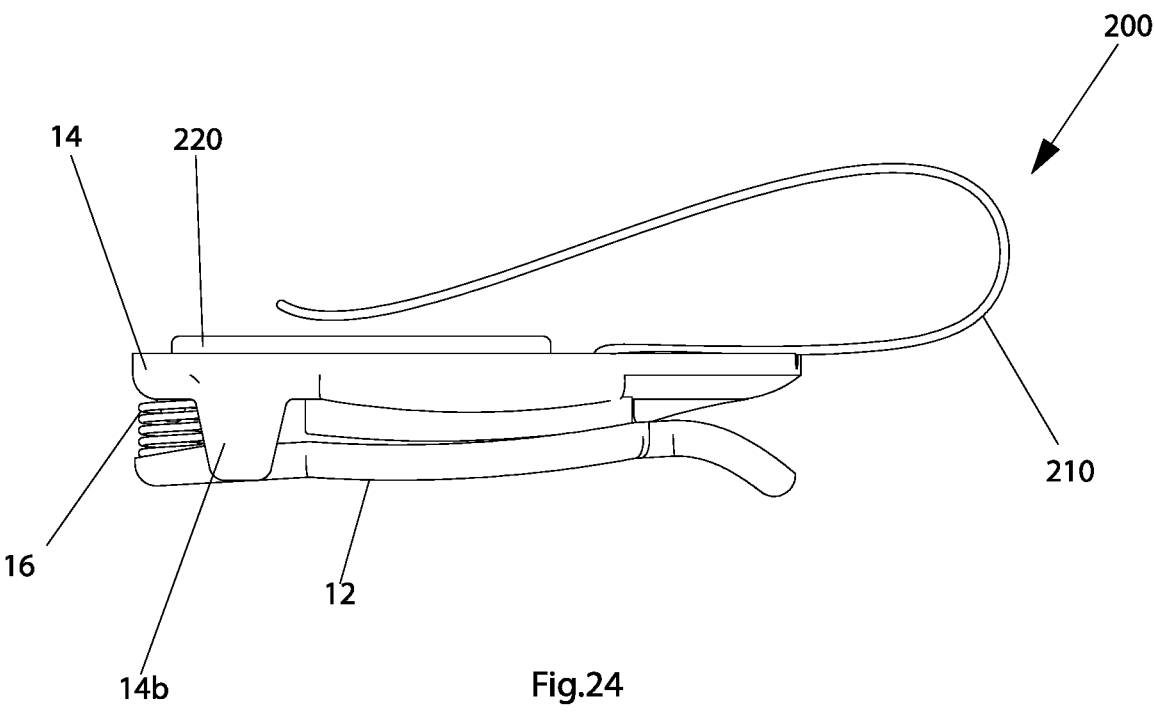
FIG. 24 is a left side view of the clip in FIG. 20.
Figure 25:
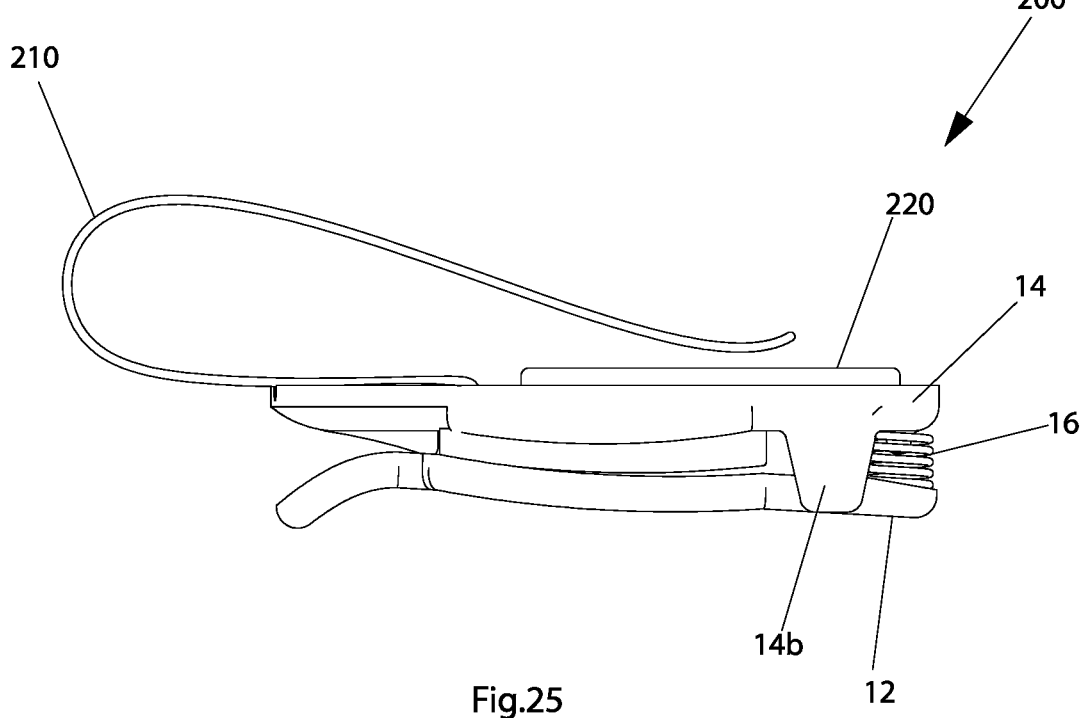
FIG. 25 is a right-side view of the clip in FIG. 20.

FIGS. 16-18 show sun visor assembly 100 in the process of clip 10 being mounted to sun visor 50. As noted above, clip 10 is mounted to sun visor 50 by positioning first fasteners 20 to extend into respective through holes 52 of sun visor 50. Thereafter, clip 10 is securely mounted to sun visor 50 by inserting second fasteners 22 into respective openings 21 of first fasteners 20. FIG. 19 shows the state in which clip 10 is securely mounted to sun visor 50.

As described above, clip 10 is configured to be securely integrated with sun visor 50 so that first body portion 12 is permitted to pivot about pivotal shaft 12b relative to second body portion 14 that is securely and fixedly mounted to sun visor 50 via first fasteners 20 and second fasteners 22. As best shown in FIGS. 18 and 19, clip 10 is mounted to sun visor 50 so as to be accessible by the user along a lateral edge 55 of sun visor 50 opposite to a lateral edge of sun visor 50 provided with connecting member 75.

FIG. 19 is a partial view of the sun visor assembly 100 illustrating an exemplary embodiment in which clip 10 securely clamps/holds a pair of glasses 150 between first and second body portions 12, 14 while being protected by cushion member 18. By this arrangement, when securely mounted to sun visor 50 as described above with reference to the drawings, clip 10 is effective to prevent glasses 150 from being lost, broken, or scratched. Sun visor assembly 100 is therefore designed to securely hold (i.e., by providing substantial holding or clamping force) and protect glasses (e.g., sunglasses and eyeglasses) on sun visor 50 while providing convenient access to glasses 150 by vehicle drivers and passengers. Sun visor assembly 100 accomplishes this without touching the lenses of glasses 150, as shown in FIG. 19. Because sun visor assembly 100 is configured to only touch the bridge and/or temples of glasses 150, there is easy insertion and extraction of glasses 150. Sun visor assembly 100 prevents glasses 150 from escaping the security of clip 10 due to expected and unexpected vehicle motion.

FIGS. 21-30 show a clip 200 according to a second embodiment of the present invention. Clip 200 has the same construction as clip 100 described above for the first embodiment except as further described below, where the same reference numerals denote the same structure.

Figure 26:
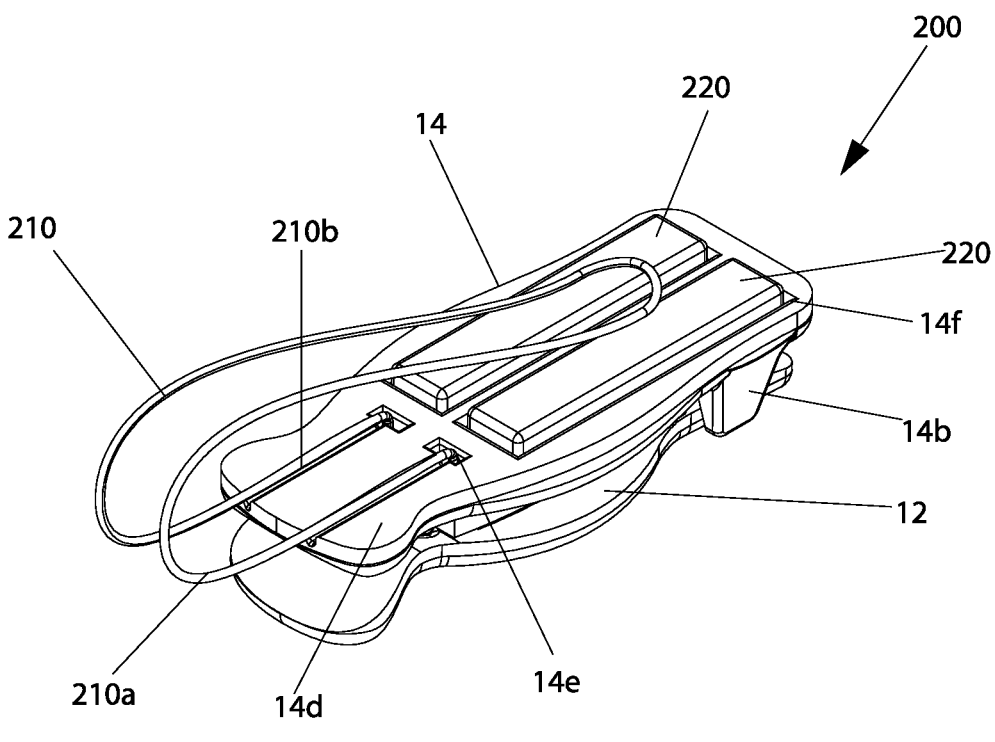
FIG. 26 is a bottom view in perspective of the clip in FIG. 20.
Figure 27:
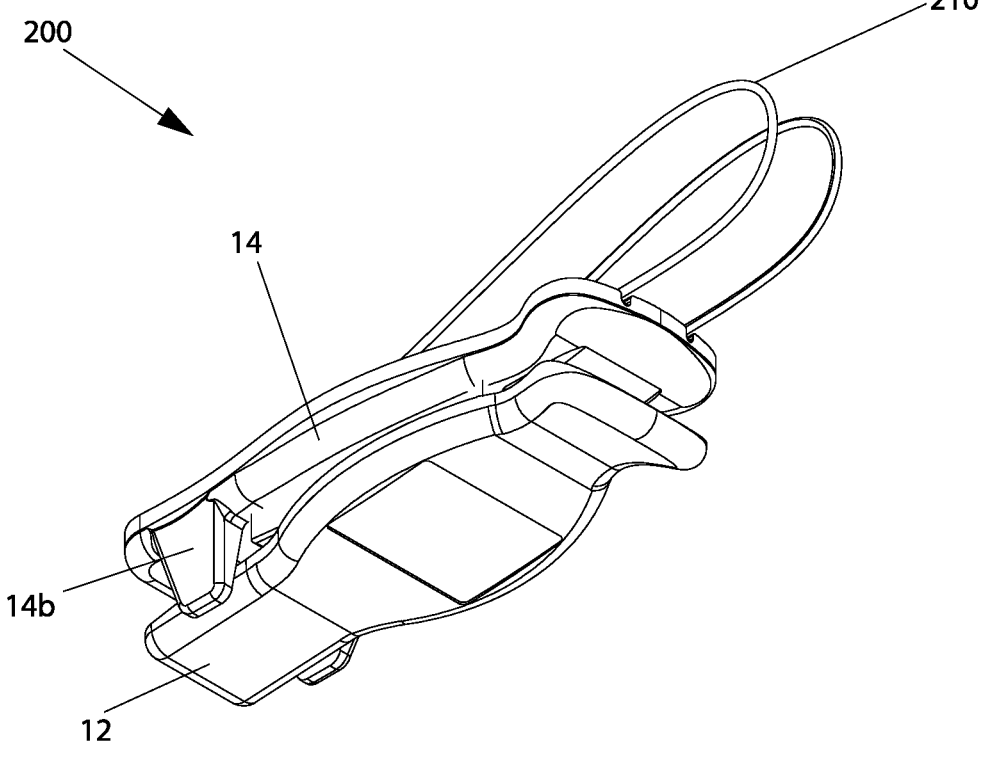
FIG. 27 is a top view in perspective of the clip in FIG. 20.
Figures 28, 29:
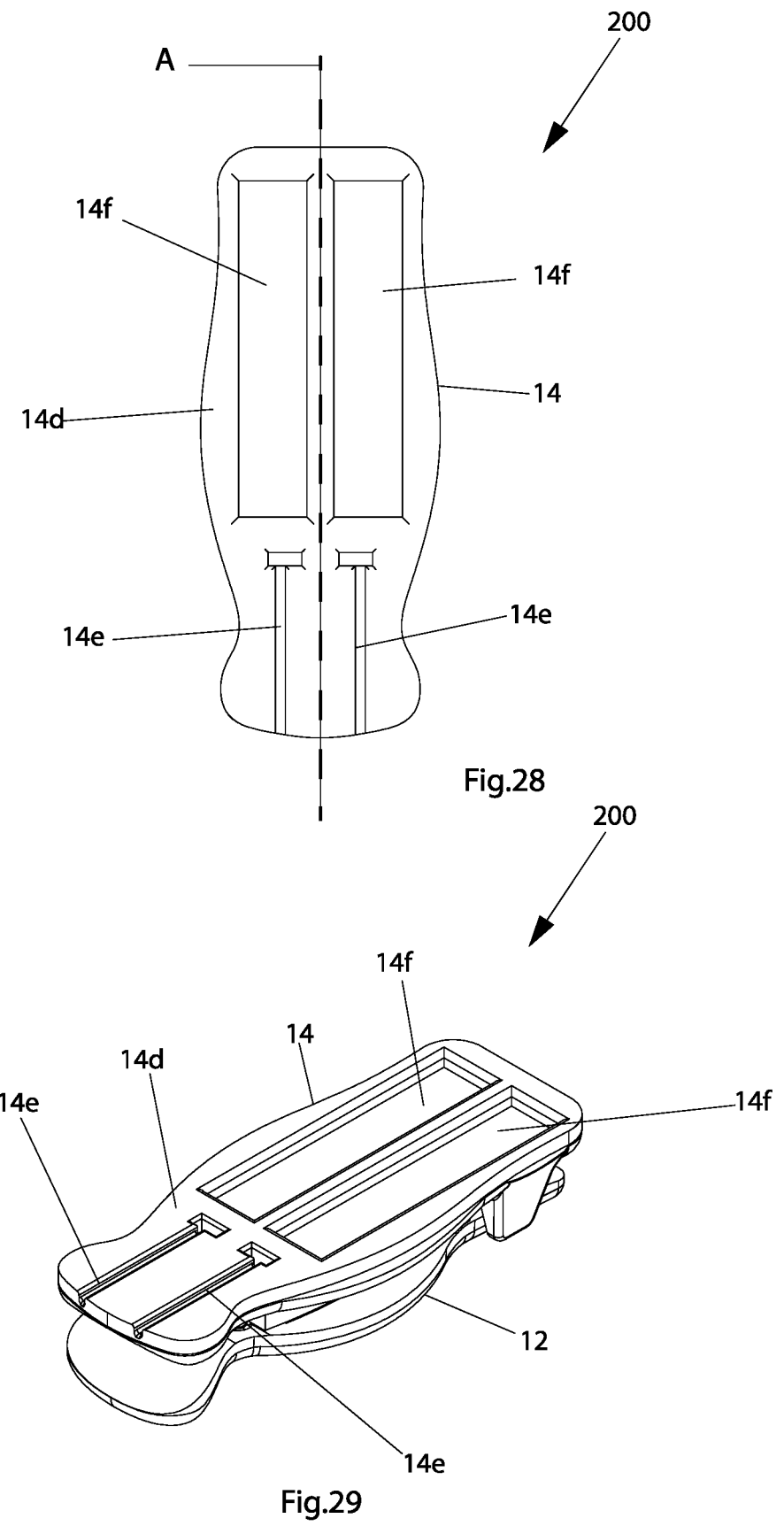
FIG. 28 is a view like FIG. 21, except that in FIG. 28 the retaining element and magnetic elements of the clip are omitted for illustration purposes.
FIG. 29 is a view like FIG. 26, except that in FIG. 29 the retaining element and magnetic elements of the clip are omitted for illustration purposes.
Figure 30:
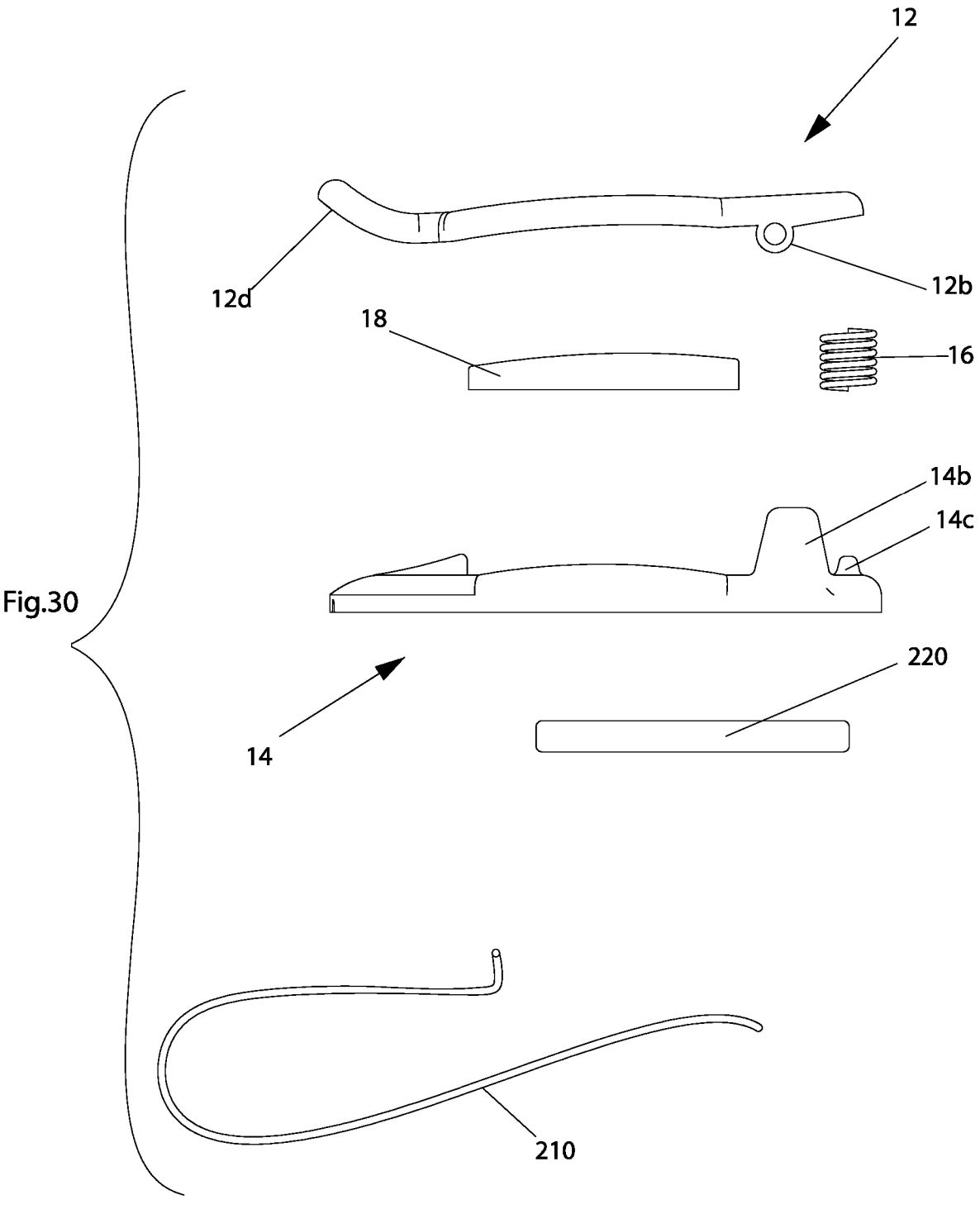
FIG. 30 is an exploded view of the clip according to the second embodiment.

The difference between clip 200 of the second embodiment and clip 100 of the first embodiment is in the structural configuration for mounting clip 200 to a structural assembly, such as a sun visor. Referring to FIGS. 26, 28 and 29, this difference lies in the construction of surface 14d of second body portion 14, which is formed with a pair of first retaining recesses 14e and a pair of second retaining recesses 14f.

First retaining recesses 14e are configured to receive and securely retain therein leg portions 210a, 210b of a retaining element 210 (FIG. 26). For example, leg portions 210a, 210b can be retained in first retaining recesses 14e by friction fit, or in any other appropriate manner, such as by a suitable adhesive, so long as leg portions 210a, 210b are securely retained in first retaining recesses 14e. When secured to surface 14d of second body portion 14 in this manner, retaining element 210 is configured to removably securely mount clip 200 to a structural assembly as described below.

Figures 33, 34:
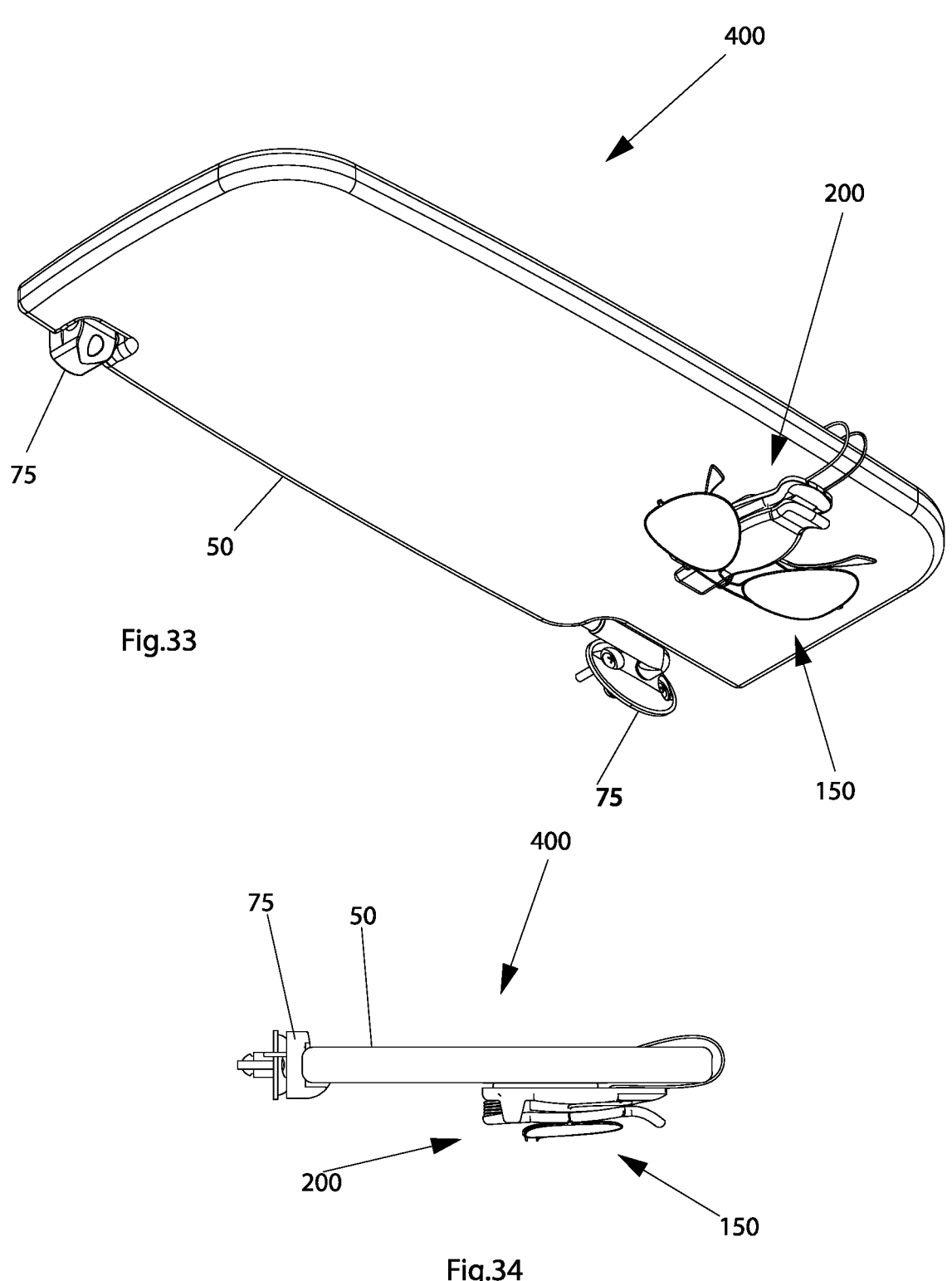
FIG. 33 is a perspective view showing the clip of the second embodiment mounted on a sun visor.
FIG. 34 is a side view of the clip of the second embodiment mounted on the sun visor.

FIGS. 33 and 34 illustrate an embodiment of a structural assembly in the form of a sun visor assembly 400 in which clip 200 is removably securely mounted to sun visor 50 by retaining element 210. The specific design of clip 200, including retaining element 210, permits clip 200 to be readily mounted to sun visor 50 so that an article, such as glasses, can be readily clipped to and/or removed from clip 200 as described above for the use of clip 100. It is appreciated that using retaining element 210, clip 200 can be securely removably mounted to structural assemblies other than sun visors, such as wall or furniture structures with edges configured to receive and accommodate retaining element 210.

Each of second retaining recesses 14f is configured to receive and securely retain therein a magnetic element 220 (FIGS. 21, 24-26). For example, magnetic elements 220 can be retained in second retaining recesses 14f by friction fit, or in any other appropriate manner, such as by a suitable adhesive, so long as magnetic elements 220 are securely retained in second retaining recesses 14f. When secured to surface 14d of second body portion 14 in this manner, magnetic elements 220 are configured to removably securely mount clip 200 to a structural assembly as described below.

Figure 31:
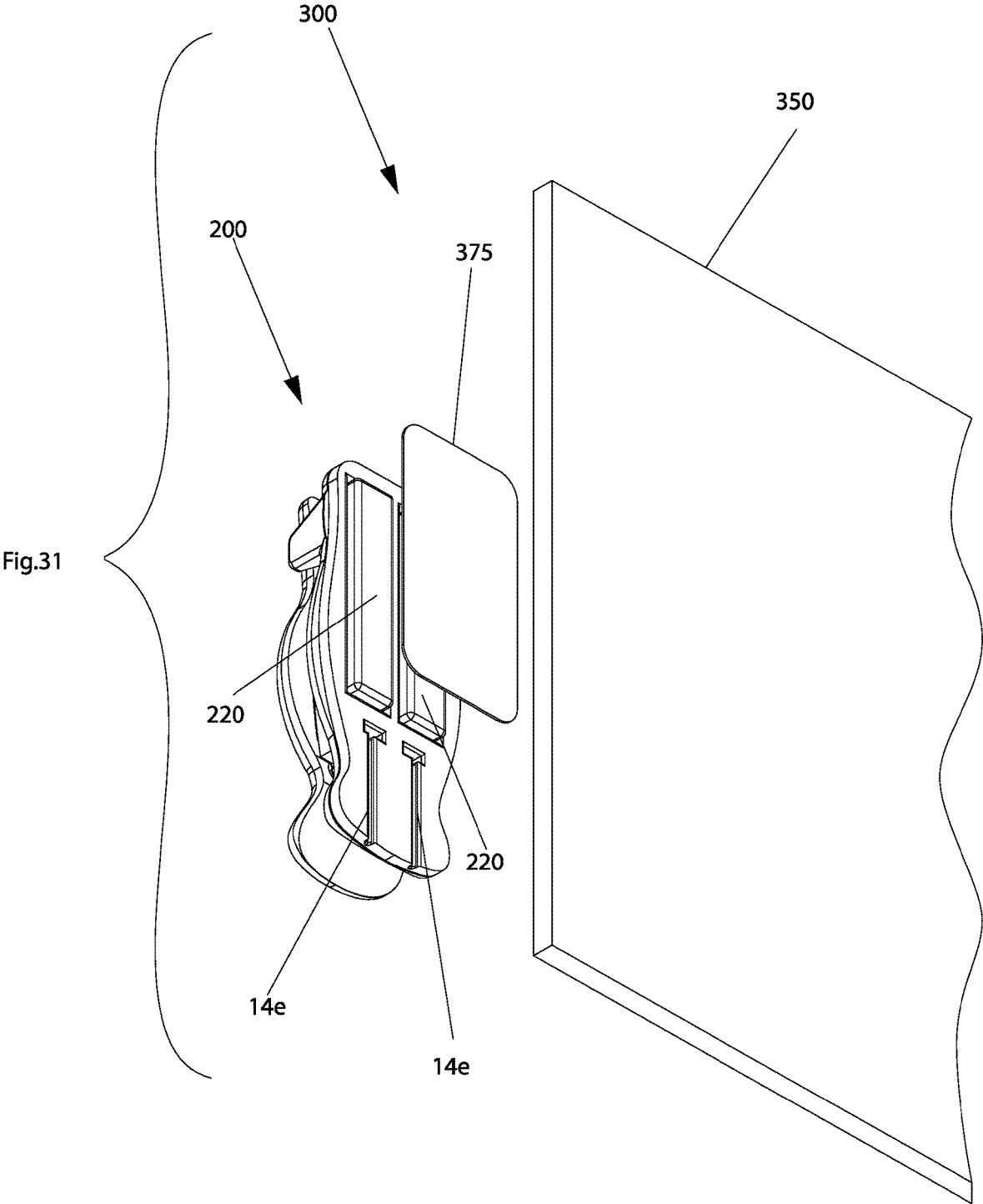
FIG. 31 is an exploded view showing the clip of the second embodiment in the process of being mounted to a structural assembly.
Figure 32:
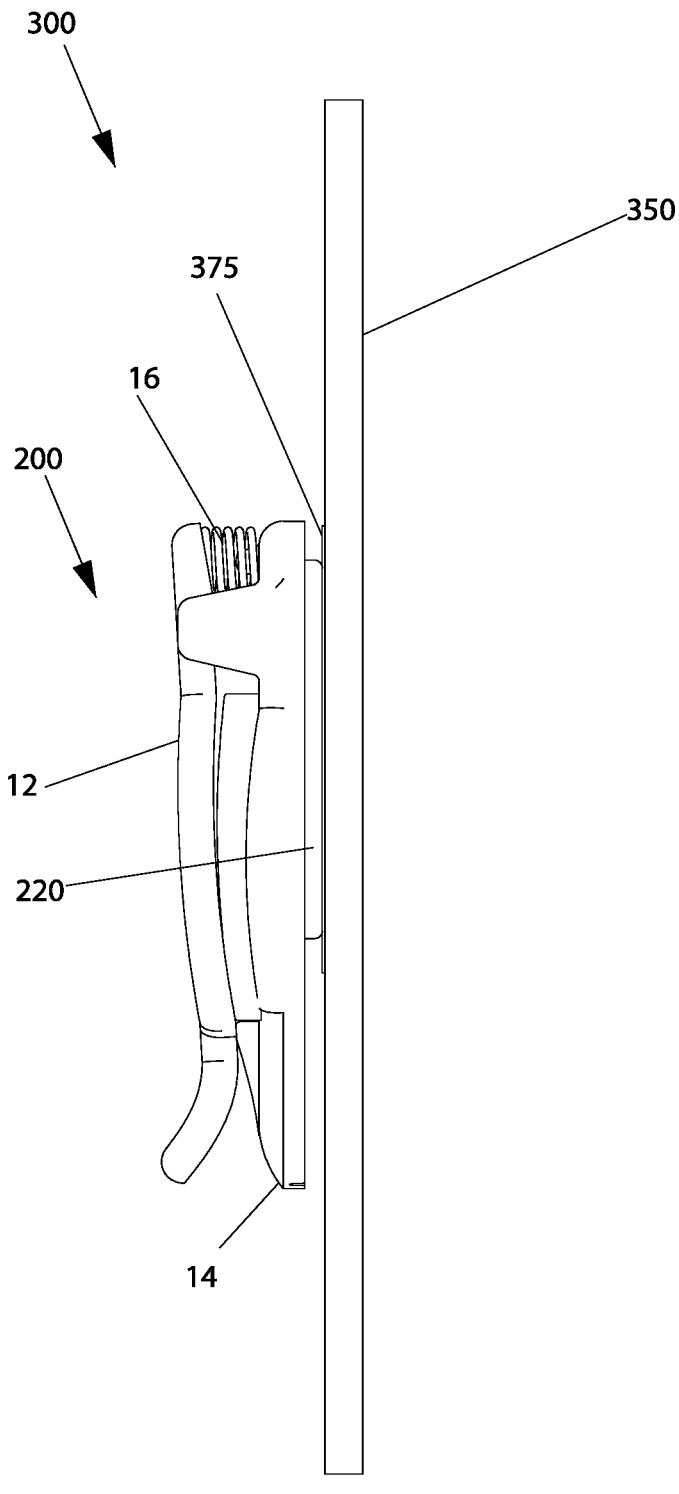
FIG. 32 is a side view showing the clip of the second embodiment mounted on the structural assembly.

FIGS. 31-32 illustrate an embodiment of a structural assembly 300 in which clip 200 is removably securely mounted to a structural assembly 350 using magnetic elements 220. FIG. 31 is an exploded view showing clip 200 in the process of being mounted to structural assembly 350, and FIG. 32 shows clip 200 mounted to structural assembly 350.

Structural assembly 350 can be any structure to which clip 200 is desired to be mounted for gripping/holding various types of articles, items, or objects. For example, structural assembly 350 can be any type of wall or furniture structure as well as a vehicle sun visor. If structural assembly 350 or any surface portion thereof is made of metal, clip 200 can be mounted to structural assembly 350 by magnetic connection between magnetic elements 220 and the metal in structural assembly 350. If structural assembly 350 does not contain a metal surface, magnetic elements 220 of clip 200 can be magnetically connected to a separate magnetic element 375 which can be attached to structural assembly 350. For example, magnetic element 375 can be in the form of a magnetic strip with an adhesive backing to facilitate attachment to structural assembly 350. The foregoing specific design of clip 200, including magnetic elements 220, permits clip 200 to be readily mounted to structural assembly 300 so that various articles, objects, and items, such as glasses, can be readily clipped to and/or removed from clip 200 as described above for the use of clip 100.

It will be appreciated from the foregoing description with reference to the drawing figures that clip 200 is especially designed to enable and facilitate a dual form of attachment to a structural assembly, via retaining element 210 and via magnetic elements 220. In first form, clip 200 can be removably securely attached to a structural assembly (e.g., a sun visor) using retaining element 210, such as shown in FIGS. 33-34, for example. In the second form, clip 200 can be removably securely attached to a structural assembly using magnetic elements 220, such as shown in FIGS. 31-32, for example. In the second form, retaining element 210 can be readily disconnected from first retaining recesses 14e formed in surface 14d of second body portion 14 so that the attachment of clip 200 to the structural assembly using magnetic elements 220 can be readily accomplished. This dual form of attachment of clip 200 to the structural assembly is another feature of the present invention.

As yet another feature of the present invention, first retaining recesses 14e and second retaining recesses 14d are formed in surface 14d of second body portion 14 so as to be symmetrical about a longitudinal axis A of second body portion 14 (FIG. 28). This symmetrical configuration ensures that clip 200 will be securely retained on the structural assembly, either via retaining element 210 or magnetic elements 220, with high stability to prevent clip 200 from being inadvertently displaced while holding/gripping various desired articles, items and objects. For example, when mounted to a vehicle sun visor, the foregoing symmetrical configuration of clip 200 prevents it from sliding off the sun visor as a result of vehicle vibrations or during movement of the sun visor by the driver/passenger to block sunlight, for example.

It will be appreciated that by the foregoing constructions of clips 10 and 200 according to the present invention, when clips 10 and 200 are mounted to respective structural assemblies a user can selectively clip a desired item on clips 10 and 200 and remove it therefrom as described above by using only a single hand. This is made possible by the fact that clips 10 and 200 can be mounted on the structural assemblies with the requisite strength and stability as described above. Clips 10 and 200 are also configured to provide sufficient holding and clamping force, particularly when the structural assembly is subjected to movement and vibrations, such as when the structural assembly is a visor assembly (e.g., as shown in FIGS. 19 and 33-34) which is subjected to vibrations from the vehicle.

While the exemplary embodiments described herein show clips 10 (FIG. 19) and 200 (FIGS. 33-34) supporting a pair of glasses during use, it is understood that clips 10 and 200 are also configured and well adapted for securely holding items and articles other than glasses, such as garage door openers and key chains, for example.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A clip for holding articles, the clip comprising:

a main body having a first body portion and a second body portion mounted to undergo pivotal movement relative to the first body portion about a pivot shaft for selectively positioning the clip between an open state and a closed state, the open state of the clip being configured to allow an article to be positioned between the first and second body portions, and the closed state of the clip being configured to securely hold the clip between the first and second body portions; and a biasing member mounted between the first and second body portions for biasing the clip to the closed state, the clip being configured for placement in the open state by pivotal movement of the first body portion relative to the second body portion against the biasing force of the biasing member;

wherein the first body portion is integrally formed with a pivot shaft and a holding recess;

wherein the second body portion is integrally formed with a pair of pivot arms and a holding pin, the pair of pivot arms being configured for connection to respective ends of the pivot shaft to connect the first and second body portions together and to permit pivotal movement of the first body portion relative to the second body portion about the pivot shaft; and wherein the biasing member is configured to be securely retained between the first and second body portions by the holding recess of the first body portion and the holding pin of the second body portion such that the biasing member is spaced from and does not engage the pivot shaft.

2. The clip of claim 1, further comprising a cushioning member disposed between the first and second body portions for protecting an article that is held therebetween.

3. The clip of claim 1, wherein the holding recess is formed at one end of the first body portion and the holding pin extends from an end of the second body portion such that when the first and second body portions are connected together, the holding recess, the holding pin and the biasing member are spaced apart from the pair of pivot arms and positioned outside of a region between the pair of pivot arms.

4. The clip of claim 1, wherein the first body portion, including the pivot shaft and the holding recess, is a unitary structure formed from a single piece of material; and wherein the second body portion, including the pair of pivot arms and the holding pin, is a unitary structure formed from a single piece of material.

5. The clip of claim 4, wherein the single piece of material for the first and second body portion comprises a plastic material.

6. The clip of claim 1, further comprising mounting means for mounting the clip to a structural assembly.

7. The clip of claim 6, wherein the mounting means comprises a pair of first fasteners extending from a surface of the second body portion; and wherein the clip is configured to be mounted to the structural assembly by passing the first fasteners through respective openings formed in the structural assembly and bringing the first fasteners into engagement with respective second fasteners to securely mount the clip to the structural assembly.

8. The clip of claim 6, wherein the mounting means comprises a retaining element configured for secure, removable connection to a surface of the second body portion, the retaining element including leg portions, and the surface of the second body portion including retaining recesses for securely, removably receiving and retaining therein the respective leg portions of the retaining element; and wherein each leg portion of the retaining element has a connection end, each retaining recess of the second body portion has a first recess portion and a second recess portion extending from the first recess portion to an end of the second body portion, the first recess portion is configured for securely, removably receiving the connection end, and the second recess portion is configured for securely, removably receiving the leg portion.

9. The clip of claim 6, wherein the mounting means comprises magnetic members connected to a surface of the second body portion, the magnetic members being configured for removable magnetic connection to the structural assembly.

10. The clip of claim 9, further comprising retaining recesses formed in the surface of the second body member, the retaining recesses being separate from one another and configured to separately receive and retain the respective magnetic members therein.

11. The clip of claim 6, wherein:

the mounting means comprises first and second mounting means each selectively used to mount the clip to the structural assembly;

the first mounting means comprises a retaining element configured for secure, removable connection to a surface of the second body portion, the retaining element including leg portions, the surface of the second body portion including first retaining recesses for securely, removably receiving and retaining therein the respective leg portions of the retaining element, each leg portion of the retaining element having a connection end, each first retaining recess of the second body portion having a first recess portion and a second recess portion extending from the first recess portion to an end of the second body portion, the first recess portion being configured for securely, removably receiving the connection end, and the second recess portion being configured for securely, removably receiving the leg portion; and the second mounting means comprises magnetic members connected to a surface of the second body portion and configured for removable magnetic connection to the structural assembly, and further comprising second retaining recesses formed in the surface of the second body portion, the second retaining recesses being separate from one another and configured to separately receive and retain the respective magnetic members therein.

12. A sun visor assembly equipped with the clip of claim 1.

13. The clip of claim 1, wherein when the first and second body portions are connected together, the holding recess of the first body portion is disposed in confronting relation to the holding pin of the second body portion so that the biasing member retained by the holding recess and the holding pin extends generally vertically from the first and second body portions.

14. The clip of claim 13, wherein the biasing member comprises a single coil spring having a open end configured to extend into the holding recess of the first body portion and as second open end configured to receive the holding pin of the second body portion.

15. The clip of claim 8, wherein the second recess portions of the retaining recesses are disposed parallel to one another.

16. The clip of claim 11, wherein the second recess portions of the first retaining recesses are disposed parallel to one another; and wherein the second retaining recesses are disposed generally parallel to one another.

17. The clip of claim 11, wherein the first and second retaining recesses are formed in the surface of the second body portion so as to be symmetrical about a longitudinal axis of the second body portion, such that the symmetrical configuration ensures the clip is securely retained on a structural assembly, including via the retaining element or the magnetic elements, providing high stability and preventing inadvertent displacement of the clip while holding an article.

18. The clip of claim 1, further comprising a retaining element and magnetic connecting members, wherein the clip can be mounted to the structural assembly using either the retaining element or the magnetic connecting members, each being independently selectable for mounting.

19. A clip for holding articles, the clip comprising:

a main body including a first body portion and a second body portion mounted for pivotal movement relative to one another to selectively position the clip between an open state and a closed state, the open state being configured to permit an article to be positioned between the first and second body portions, and the closed state being configured to securely retain the article between the first and second body portions;

a biasing member disposed between the first and second body portions and configured to bias the clip toward the closed state, the clip being movable to the open state by pivotal movement of the first body portion relative to the second body portion against a biasing force of the biasing member; and a retaining element and magnetic connecting members, each independently selectable for mounting the clip to a structural assembly;

wherein the first body portion comprises a unitary structure integrally formed with a pivot shaft and a holding recess, the holding recess being formed at an end of the first body portion adjacent to the pivot shaft and configured to receive at least a portion of the biasing member;

wherein the second body portion comprises a unitary structure integrally formed with a pair of pivot arms and a holding pin, the pivot arms being configured to engage respective ends of the pivot shaft to connect the first and second body portions and to permit pivotal movement therebetween, the holding pin extending from an end of the second body portion adjacent to the pivot arms;

wherein, when the first and second body portions are connected together, the holding recess of the first body portion is disposed in confronting relation to the holding pin of the second body portion, the biasing member having a open end received within the holding recess and a second open end receiving the holding pin;

wherein the biasing member is securely retained between the first and second body portions by cooperation of the holding recess and the holding pin such that the biasing member is spaced from and does not engage the pivot shaft; and wherein the holding recess and the holding pin are positioned such that, when the first and second body portions are connected together, the holding recess, the holding pin, and the biasing member retained therebetween are spaced apart from and not disposed between the pivot arms.

20. A clip for holding articles, the clip comprising:

a main body comprising a first body portion and a second body portion mounted for pivotal movement relative to one another about a pivot shaft to selectively position a clip between an open state, in which an article can be positioned between the first and second body portions, and a closed state, in which the article is retained between the first and second body portions;

a biasing member disposed between the first and second body portions and configured to bias the clip toward the closed state, the clip being movable to the open state by pivotal movement of the first body portion relative to the second body portion against a biasing force of the biasing member;

the first body portion including the pivot shaft and a holding recess;

the second body portion including a pair of pivot arms configured to engage the pivot shaft to permit pivotal movement of the first and second body portions relative to one another, and a holding element cooperating with the holding recess to retain the biasing member, the holding recess and holding element being positioned outside a region between the pair of pivot arms; and the biasing member being retained by the holding element and holding recess such that the biasing member is spaced from and does not engage the pivot shaft and such that the biasing member is positioned outside the region between the pair of pivot arms.

* * * * *